US012687556B2

(12) United States Patent
Yano et al.

(10) Patent No.:    US 12,687,556 B2
(45) Date of Patent:        Jul. 21, 2026

(54) SPECIMEN INSPECTION SYSTEM, AND CONVEYANCE METHOD

(71) Applicant: Hitachi High-Tech Corporation, Tokyo (JP)

(72) Inventors: Shigeru Yano, Tokyo (JP); Shinji Azuma, Tokyo (JP); Takeshi Matsuka, Tokyo (JP)

(73) Assignee: HITACHI HIGH-TECH CORPORATION, Tokyo (JP)

( * ) Notice:    Subject to any disclaimer, the term of this patent is extended or adjusted under 35 U.S.C. 154(b) by 539 days.

(21) Appl. No.:    18/275,448

(22) PCT Filed:    Nov. 25, 2021

(86) PCT No.:    PCT/JP2021/043172
§ 371 (c)(1),
(2) Date:    Aug. 2, 2023

(87) PCT Pub. No.:    WO2022/208988
PCT Pub. Date: Oct. 6, 2022

(65)            Prior Publication Data

US 2024/0036068 A1        Feb. 1, 2024

(30)        Foreign Application Priority Data

Mar. 29, 2021    (JP) ................................. 2021-055002

(51) Int. Cl.
*G01N 35/04*        (2006.01)
*B65G 54/02*        (2006.01)
*G01N 35/00*        (2006.01)
(52) U.S. Cl.
CPC ............. *G01N 35/04* (2013.01); *B65G 54/02* (2013.01); *G01N 35/00584* (2013.01)

(58) Field of Classification Search
CPC ......... B65G 54/02; G01N 2035/00326; G01N 2035/0475; G01N 2035/0484;
(Continued)

(56)            References Cited

U.S. PATENT DOCUMENTS

2014/0231217 A1    8/2014    Denninger et al.
2014/0277699 A1    9/2014    Moix et al.
(Continued)

FOREIGN PATENT DOCUMENTS

EP        3905515 A1 * 11/2021    ............. B65G 54/02
JP        61-217434 A    9/1986
(Continued)

OTHER PUBLICATIONS

International Search Report of PCT/JP2021/043172 dated Jan. 18, 2022.
(Continued)

*Primary Examiner* — Jennifer Wecker
*Assistant Examiner* — Jonathan Bortoli
(74) *Attorney, Agent, or Firm* — MATTINGLY & MALUR, PC

(57)            ABSTRACT

In a two-dimensional conveyance line employing an electromagnetic conveyance technique, carriers are conveyed in consideration of the length of a group of stagnated carriers, so as to reduce idle positions and ensure conveyance efficiency of a specimen inspection system and maximize the number of carriers conveyed simultaneously. Current is supplied to a winding of an electromagnetic circuit and an electromagnetic force is generated between the winding and a carrier with a magnet that holds a test tube to move the carrier. The processing efficiency of a specimen inspection system is improved by changing the current of the electromagnetic circuit to change a conveyance speed of the carrier to which the specimen sample is mounted, and by shortening
(Continued)

the conveyance time, and reducing the conveyance speed of the carrier and increasing the number of carriers that are conveyed simultaneously as an alternative to detouring the carrier during congestion.

4 Claims, 7 Drawing Sheets

(58) Field of Classification Search
CPC ..... G01N 2035/0491; G01N 35/00584; G01N 35/04; G01R 31/3191; G01R 35/00
See application file for complete search history.

(56) References Cited

U.S. PATENT DOCUMENTS

| | | | |
|---|---|---|---|
| 2016/0207717 A1 | 7/2016 | Senn et al. | |
| 2016/0341751 A1 | 11/2016 | Huber et al. | |
| 2017/0131309 A1 | 5/2017 | Pedain | |
| 2020/0400698 A1 | 12/2020 | Hafner et al. | |
| 2022/0144556 A1 | 5/2022 | Aoyama et al. | |
| 2022/0238267 A1 | 7/2022 | Hoshi et al. | |
| 2022/0252626 A1* | 8/2022 | Yano | G01N 35/02 |
| 2022/0252628 A1 | 8/2022 | Tamakoshi et al. | |

FOREIGN PATENT DOCUMENTS

| | | | |
|---|---|---|---|
| JP | 06-197411 | A | 7/1994 |
| JP | 07-048028 | A | 2/1995 |
| JP | 2000-275251 | A | 10/2000 |
| JP | 2014-520018 | A | 8/2014 |
| JP | 2015-017868 | A | 1/2015 |
| JP | 2016-166890 | A | 9/2016 |
| JP | 2016-218060 | A | 12/2016 |
| JP | 2017-522564 | A | 8/2017 |
| JP | 2019-194126 | A | 11/2019 |
| JP | 2020-075780 | A | 5/2020 |
| JP | 2020-205698 | A | 12/2020 |
| JP | 2021-010254 | A | 1/2021 |
| WO | 2012/158520 | A1 | 11/2012 |
| WO | 2015/140155 | A1 | 9/2015 |
| WO | 2016/012555 | A1 | 1/2016 |
| WO | 2019/170488 | A1 | 9/2019 |
| WO | 2020/183890 | A1 | 9/2020 |
| WO | 2021/002080 | A1 | 1/2021 |
| WO | 2021/014676 | A1 | 1/2021 |

OTHER PUBLICATIONS

International Preliminary Report corresponding to International Application No. PCT/JP2021/043172 issued on Dec. 22, 2022.

International Preliminary Report on Patentability received in corresponding International Application No. PCT/JP2021/043172 dated Dec. 22, 2022.

Extended European Search Report received in corresponding European Application No. 21935141.8 dated Jan. 15, 2025.

* cited by examiner

[FIG. 1A]
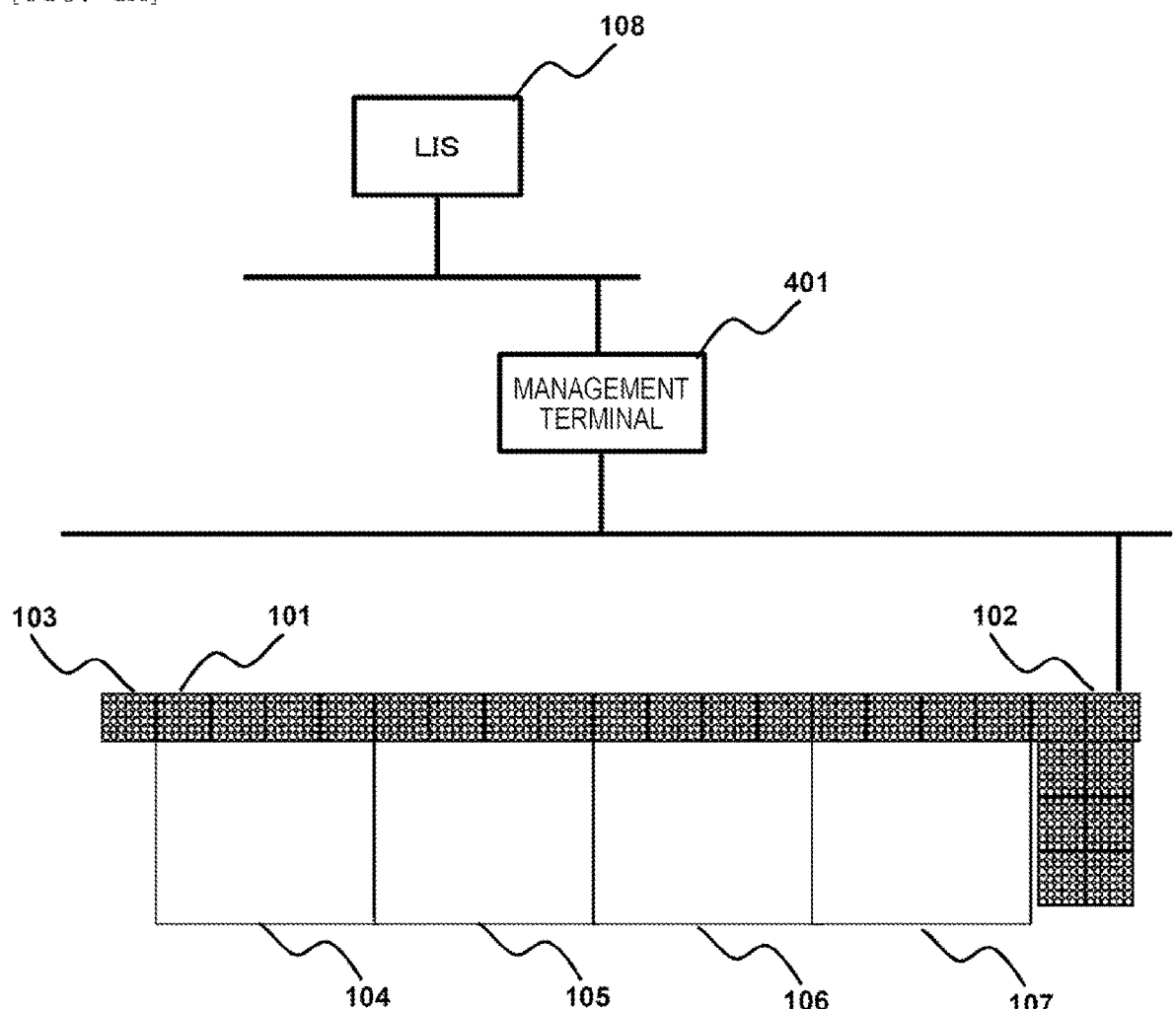

[FIG. 1B]
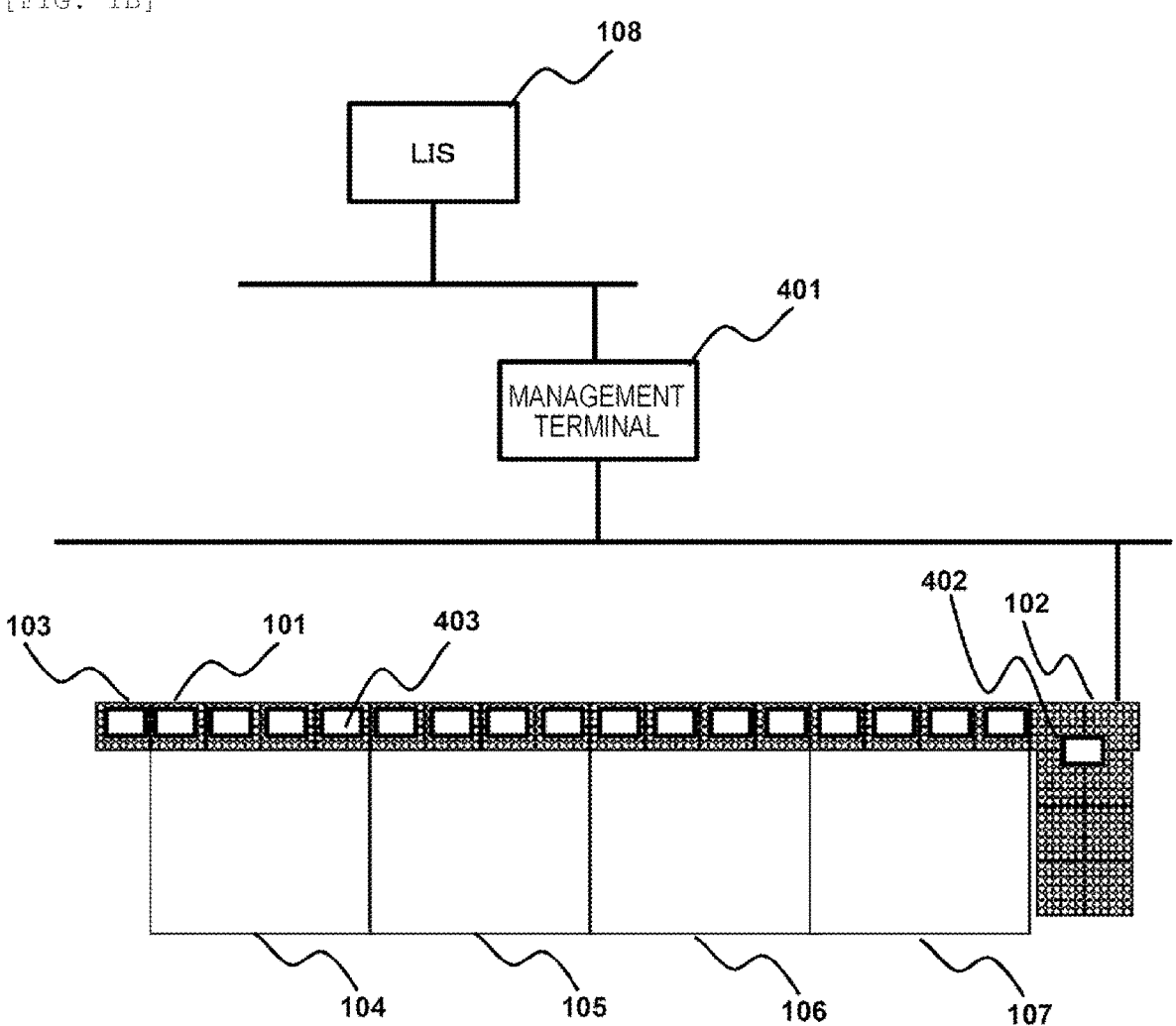

[FIG. 2]
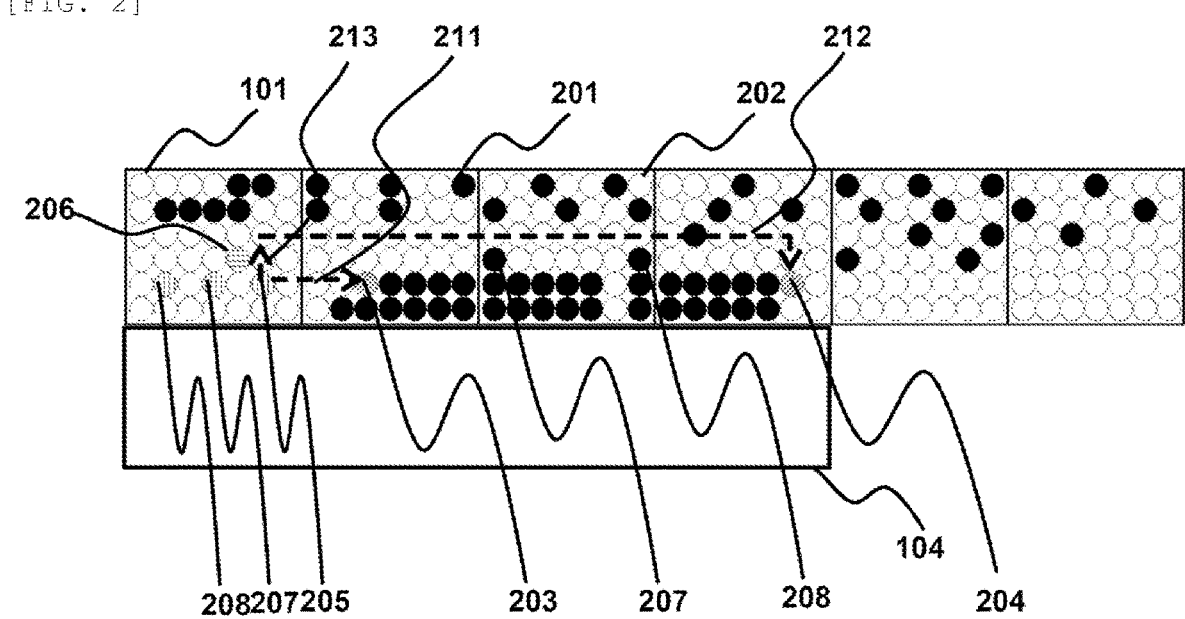

[FIG. 3]
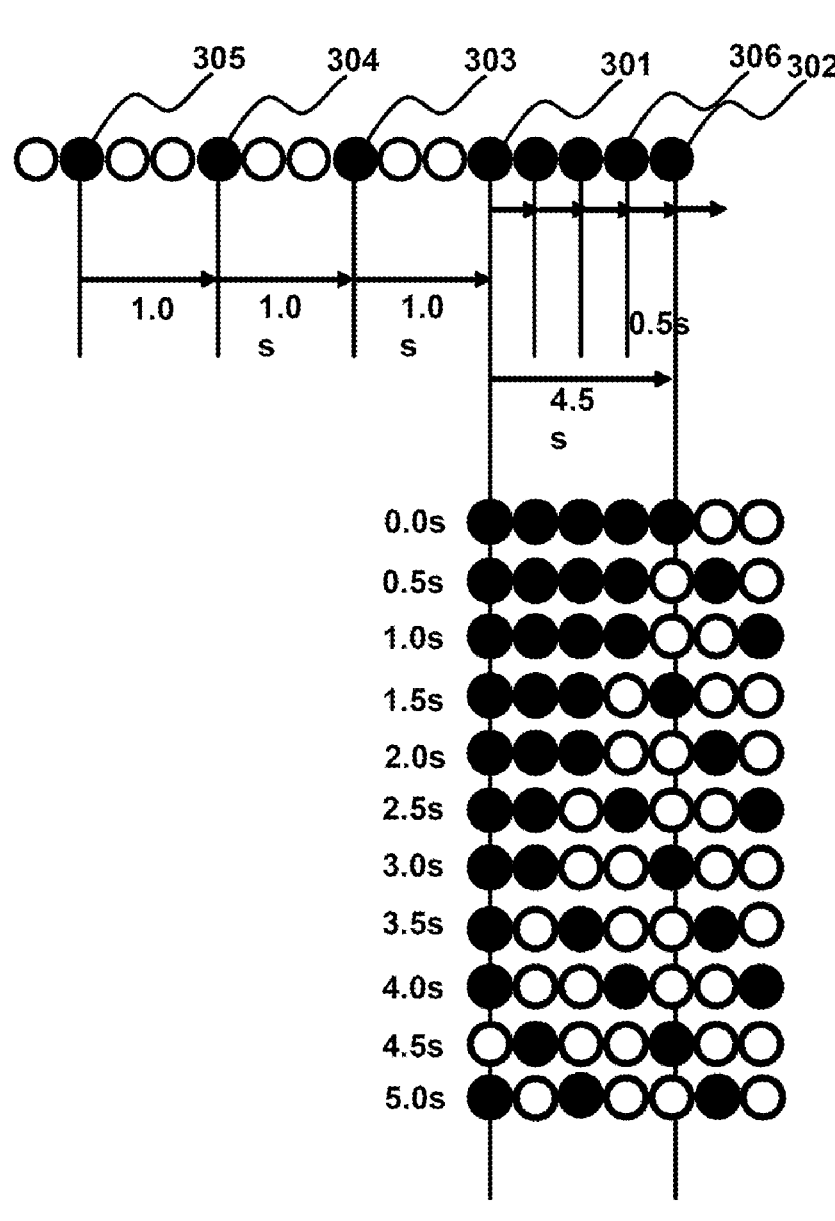

[FIG. 4]
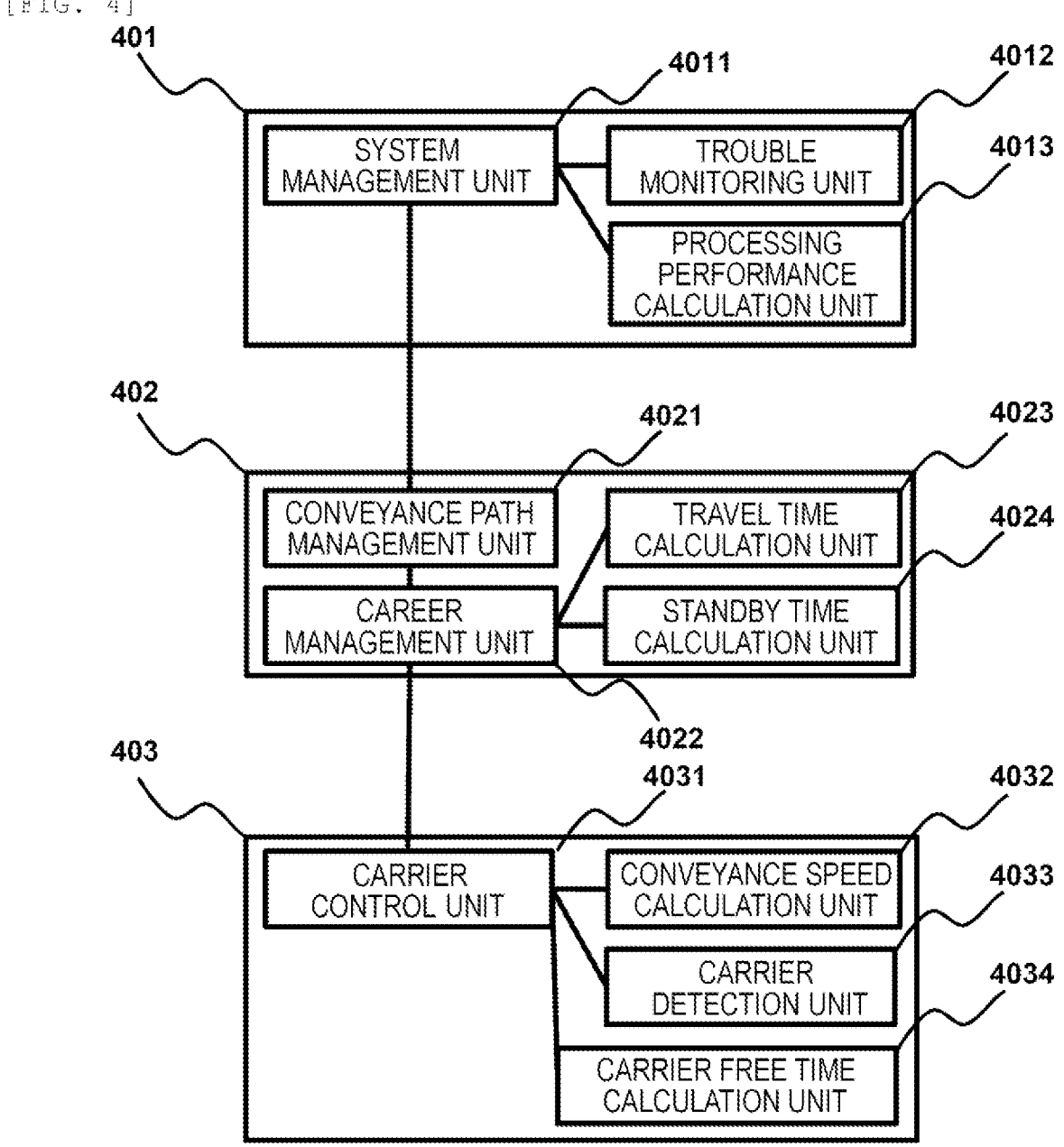

[FIG. 5]

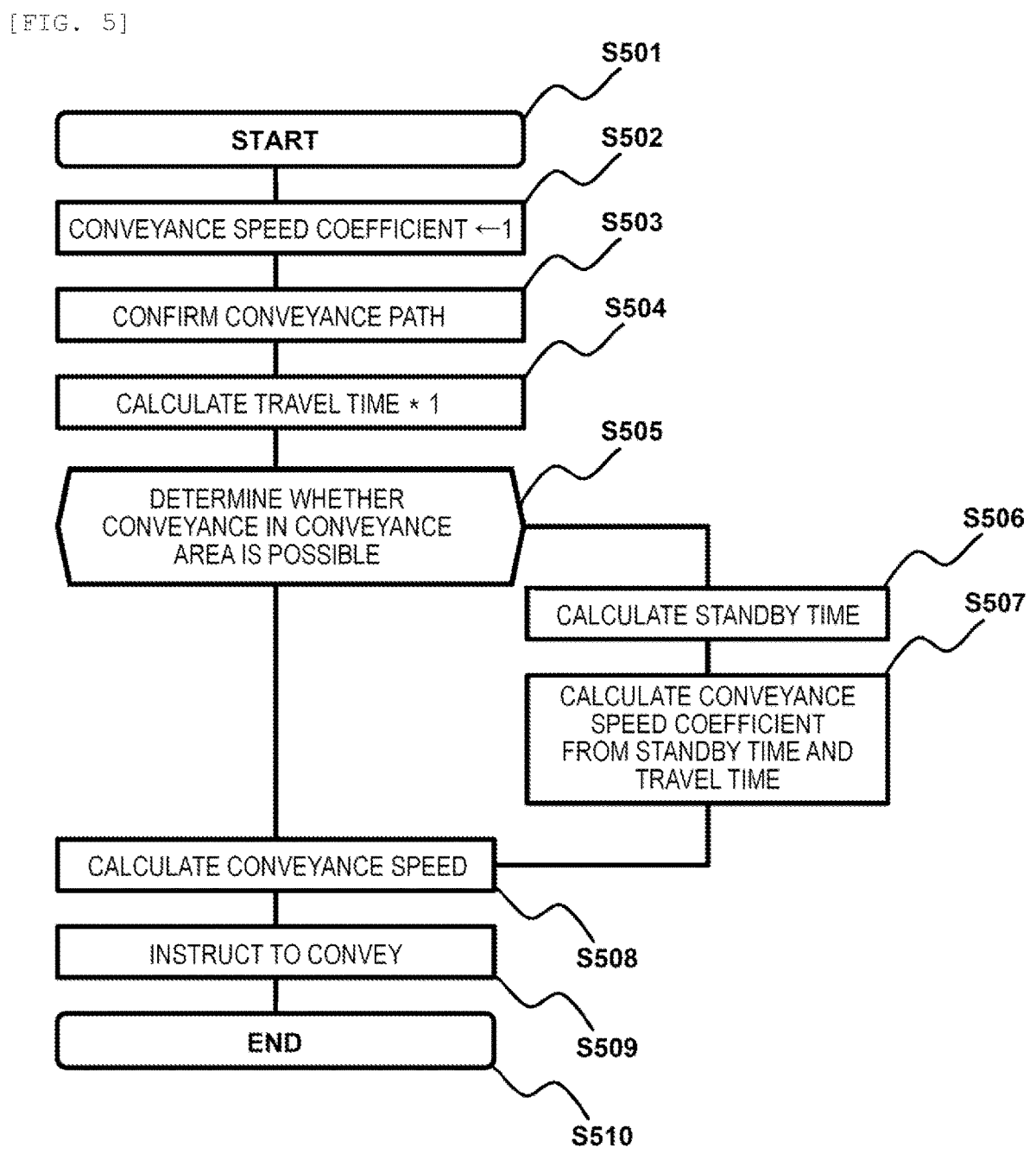

```
                                                      ┌─ S501
                        ┌──────────────────────────┐
                        │          START           │───── S502
                        └──────────────────────────┘
                                     │
                        ┌──────────────────────────┐
                        │ CONVEYANCE SPEED COEFFICIENT ←1 │──── S503
                        └──────────────────────────┘
                                     │
                        ┌──────────────────────────┐
                        │  CONFIRM CONVEYANCE PATH  │──── S504
                        └──────────────────────────┘
                                     │
                        ┌──────────────────────────┐
                        │  CALCULATE TRAVEL TIME * 1 │
                        └──────────────────────────┘
                                     │                         S505
                   ┌──────────────────────────────────┐
                   │      DETERMINE WHETHER            │
                   │  CONVEYANCE IN CONVEYANCE         │──────┐
                   │       AREA IS POSSIBLE            │      │        S506
                   └──────────────────────────────────┘      │
                                     │              ┌──────────────────────┐
                                     │              │ CALCULATE STANDBY TIME │──── S507
                                     │              └──────────────────────┘
                                     │                         │
                                     │              ┌──────────────────────┐
                                     │              │  CALCULATE CONVEYANCE │
                                     │              │   SPEED COEFFICIENT   │
                                     │              │  FROM STANDBY TIME AND │
                                     │              │      TRAVEL TIME      │
                                     │              └──────────────────────┘
                                     │                         │
                   ┌──────────────────────────┐                │
                   │ CALCULATE CONVEYANCE SPEED │───────────────┘
                   └──────────────────────────┘
                                     │                   S508
                   ┌──────────────────────────┐
                   │    INSTRUCT TO CONVEY     │──── S509
                   └──────────────────────────┘
                                     │
                   ┌──────────────────────────┐
                   │           END            │──── S510
                   └──────────────────────────┘
```

[FIG. 6]
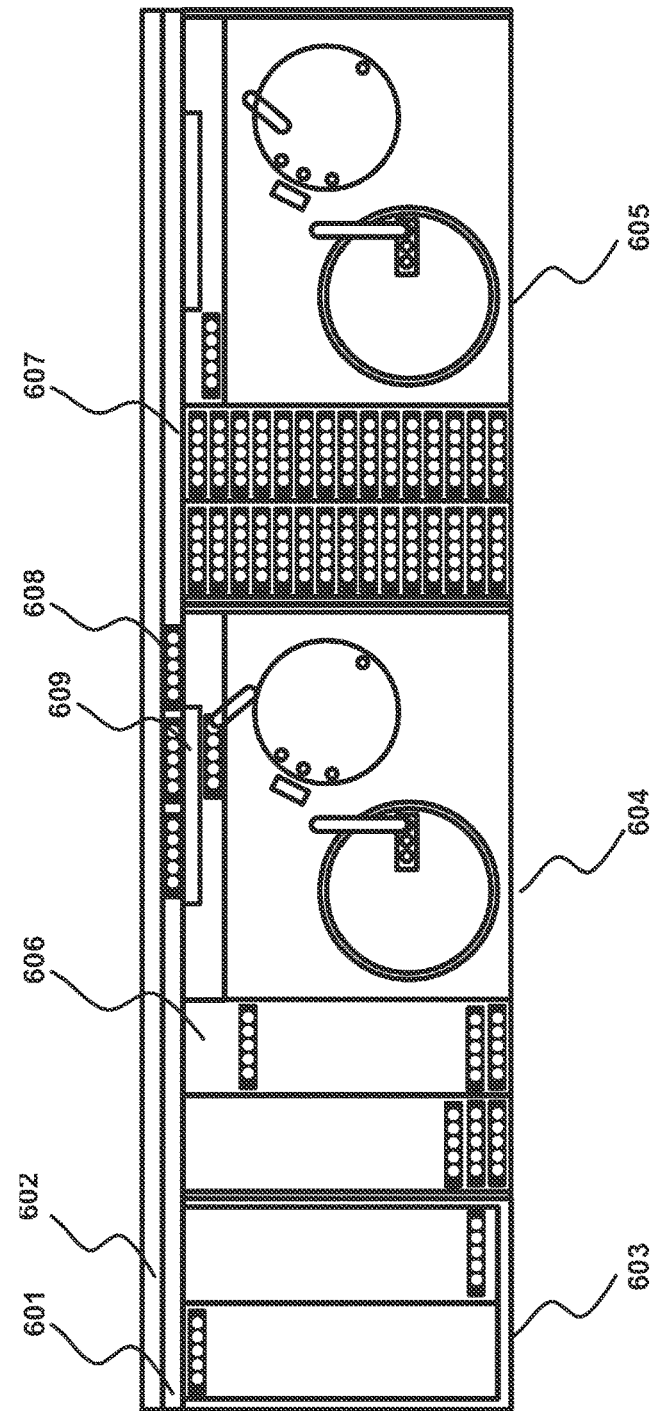

SPECIMEN INSPECTION SYSTEM, AND CONVEYANCE METHOD

TECHNICAL FIELD

The present invention relates to a specimen inspection system, and more particularly, to a technique for conveying a test tube containing a specimen to be inspected.

BACKGROUND ART

An analysis system for analyzing the components of a biological sample such as blood, plasma, serum, and urine collected from human requires a conveyance line for conveying a test tube containing such biological sample after centrifuging and opening to an analysis unit. A technique is known, which supplies current to a winding of an electromagnetic circuit in the conveyance line of the analysis system to generate an electromagnetic force between the electromagnetic circuit and a carrier with a magnet that holds the test tube, thereby moving the carrier (PTL 3). There is a two-dimensional conveyance line that employs such technique and includes electromagnetic coils arranged two-dimensionally.

Meanwhile, electromagnetic force technique is applied for moving an object such as the carrier described above. PTL 1 discloses a technique for conveying an article by a mover that is moved by electromagnetic interaction. However, in PTL 1, the mover is moved along the stator corresponding to the fixed conveyance path.

PTL 2 also describes that the conveyance elements are moved along a predetermined route by the magnetic attraction of one or more magnets moved along the route, resulting in travel of the carrier on a fixed conveyance path.

CITATION LIST

Patent Literature

PTL 1: JP2020-075780A
PTL 2: JP2014-520018A
PTL 3: JP2020-205698A
PTL 4: JP2015-017868A

SUMMARY OF INVENTION

Technical Problem

In an automatic analysis system of the related art that includes a belt conveyance line and an analysis unit, when off-line is set because the analysis unit is in a situation of not being able to perform analysis due to failure in the analysis unit, insufficient reagents, or the like, a situation occurs where the carrier cannot be conveyed from the belt conveyance line to the analysis unit. When such state occurs for a short time, there is no significant problem, but when such state is prolonged, the time of the carrier to be carried into the analysis unit being stagnated on the belt conveyance line increases. The stagnation of one carrier hinders the conveyance of carriers positioned on the upstream side, increases the number of carriers in congestion, and affects the carriers loaded with specimen for which measurement was completed in the analysis unit. Since the carrier cannot be carried out, the congestion also affects the dispensing location of the analysis unit, resulting in a decrease in analysis efficiency. As the stagnation of the carriers continues, there is a possibility that the congestion expands to the carry-in position of the analysis unit and to the left side of the belt conveying unit near the inserting position of the automatic analysis system.

Thus, there is a possibility that congestion affects the performance of the entire analysis system. Since the belt conveyance line is driven by a single motor, the number of carriers that can be conveyed by one belt is limited, and the integrated rate of carriers is not high and free areas cannot be effectively utilized.

Meanwhile, when a two-dimensional conveyance line that employs electromagnetic conveyance technique is adopted, it is possible to make the conveyance line double-tracked and select a detour route that avoids congested areas of carriers, thereby avoiding congestions. However, providing a surplus two-dimensional conveyance line to avoid congestions means that there exists an idle part in the two-dimensional conveyance line, and it is thus difficult to obtain sufficient efficiency of conveyance.

To solve the problems described above, an object of the present invention is to provide a specimen inspection system and a conveyance method which control the conveyance speed of the carrier and prevent degradation of analysis efficiency.

Solution to Problem

To achieve the objects described above, the present invention provides a specimen inspection system in which a processing unit configured to analyze and preprocess a specimen is connected to a conveying unit that includes a plurality of conveying surfaces in each of which a plurality of electromagnetic induction coils are disposed two-dimensionally, the conveying unit being configured to generate a magnetic force by causing a current to flow through the electromagnetic induction coils, the specimen inspection system including a carrier control unit configured to convey the carrier by incorporating a magnet into the carrier and applying a current to the electromagnetic induction coils, a carrier detection unit configured to detect a position of the carrier travelling in the conveying unit, and a conveyance speed calculation unit configured to detect the position of the carrier travelling in the conveying unit by the carrier detection unit and calculate a conveyance speed of the carrier according to a distance to an arrival position of the carrier, in which the conveyance speed of each carrier is changed based on the calculated conveyance speed of the carrier.

To achieve the above objects, the present invention, provides a conveyance method by a conveying unit that includes a plurality of conveying surfaces for carriers in each of which a plurality of electromagnetic induction coils are disposed two-dimensionally, the conveying unit being configured to generate a magnetic force by causing a current to flow through the electromagnetic induction coils, the method including conveying the carrier by incorporating a magnet into the carrier and applying a current to the electromagnetic induction coils, detecting a position of the carrier travelling in the conveying unit, and calculating a conveyance speed of the carrier according to a distance from the detected position of the carrier travelling in the conveying unit to an arrival position of the carrier and changing the conveyance speed of each carrier based on the calculated conveyance speed of the carrier.

Advantageous Effects of Invention

According to the present invention, it is possible to improve the usage efficiency of a two-dimensional conveyance line that employs an electromagnetic conveyance system, and to fully exhibit the processing efficiency of an analyzer connected to the two-dimensional conveyance line.

BRIEF DESCRIPTION OF DRAWINGS

FIG. 1A is a diagram illustrating an automatic analysis system using an electromagnetic conveyance technique according to a first embodiment.

FIG. 1B is a diagram illustrating the automatic analysis system using the electromagnetic conveyance technique according to the first embodiment.

FIG. 2 is a diagram illustrating a carrier conveyance example in a two-dimensional electromagnetic conveyance line according to the first embodiment.

FIG. 3 is a diagram illustrating a conveyance example of a carrier group in the two-dimensional electromagnetic conveyance line according to the first embodiment.

FIG. 4 is a diagram illustrating a configuration example of a processing unit of an electromagnetic conveyance line according to the first embodiment.

FIG. 5 is a diagram illustrating a speed calculation logic of the two-dimensional electromagnetic conveyance line.

FIG. 6 is a diagram illustrating an automatic analysis system using a belt conveyance technique of related art.

DESCRIPTION OF EMBODIMENTS

Hereinafter, embodiments for carrying out the specimen inspection system and method of the present invention will be described with reference to the drawings. In particular, an automatic analysis system including an analysis unit will be described as an example of the specimen inspection system, but the present invention can also be applied to a specimen inspection automation system that does not include an analysis unit and only includes a pre-processing unit for opening, dispensing, and the like (see PTL 4).

First, the problem of the automatic analysis system in the related art will be described with reference to FIG. 6. As shown in the same drawing, the automatic analysis system in the related art including a belt conveyance line and an analysis unit is in a situation where carriers 608 cannot be conveyed from the belt conveyance line to an analysis unit 605, such as when off-line is set because the analysis unit 605 is in a situation of not being able to perform analysis due to failure in the analysis unit 605, insufficient reagents, or the like. When such state occurs for a short time, there is no significant problem. However, when such state is prolonged, the time during which the carrier 608 to be carried into the analysis unit 605 is stagnated on the belt conveyance line increases. The stagnation of one carrier hinders the conveyance of carriers positioned on the upstream side, increases the number of carriers in congestion, and affects carriers 609 loaded with specimen for which measurement was completed in an analysis unit 604. Since the carrier 609 cannot be carried out, the congestion also affects the dispensing location of the analysis unit 604, resulting in a decrease in the dispensing operation and subsequently, the analysis efficiency of the analysis unit 604. As the stagnation of the carriers 608 continues, there is a possibility that the congestion expands to the carry-in position of the analysis unit 604 and the congestion expands to the left side of a belt conveying unit 602 near the inserting position of the automatic analysis system.

First Embodiment

A first embodiment is an example of a specimen inspection system in which a processing unit configured to analyze and preprocess a specimen is connected to a conveying unit that includes a plurality of conveying surfaces for carriers in each of which a plurality of electromagnetic induction coils are disposed two-dimensionally, the conveying unit being configured to generate a magnetic force by causing a current to flow through the electromagnetic induction coils, the specimen inspection system including a carrier control unit configured to convey the carrier by incorporating a magnet into the carrier and applying a current to the electromagnetic induction coils, a carrier detection unit configured to detect a position of the carrier travelling in the conveying unit, and a conveyance speed calculation unit configured to detect the position of the carrier travelling in the conveying unit by the carrier detection unit and calculate a conveyance speed of the carrier according to a distances to an arrival position of the carrier, in which the conveyance speed of each carrier is changed based on the calculated conveyance speed of the carrier, and an example of a conveyance method thereof.

FIGS. 1A and 1B show a configuration example of an automatic analysis system using the two-dimensional conveyance line of the embodiment. The automatic analysis unit that performs biochemical and immunological inspections is connected in parallel to the two-dimensional conveyance line, and specimen samples are carried in mainly from a specimen conveyance system and a specimen preprocessing system that are connected to an interface unit 103. An emergency specimen, a quality control specimen, a calibration specimen, and the like can be inserted from a specimen inserting/storage unit 102. A specimen to be inserted to the automatic analysis system is filled with a sample such as blood and urine collected from a patient and mounted to a specimen carrier provided with a magnet. Specimen identification information such as a one-dimensional barcode or two-dimensional barcode for identifying the patient, or an RFID tag with information for identifying the patient and specimen is attached to a container of the specimen sample.

When the patient specimen is inserted to the automatic analysis system, the automatic analysis system reads the specimen identification information with a reader that is provided with the system, searches a management terminal 401 shown in FIG. 4 for request information for the corresponding specimen, and when there is no request information, inquires a laboratory information system (LIS) 108, which is the host of the laboratory, to obtain the request information for the inspection. Based on the request information received from the LIS 108, the management terminal 401 calculates which item is measured with which analysis unit, calculates an order in which the specimen is conveyed to the analysis units, creates destination information, and notifies the destination information to a conveyance line management unit 402. The conveyance line management unit 402 generates route information from the destination information.

Meanwhile, by a carrier detection unit 4033 in a conveyance line control unit 403, the position of the carrier on the two-dimensional conveyance line is determined and it is confirmed whether there is a carrier as an obstacle on the conveyance path. The detected information is also notified to a conveyance path management unit 4021 via a carrier management unit 4022. Normally, when the conveyance path management unit 4021 generates the route information, it is conceivable to calculate another conveyance path instead of selecting an obstructed conveyance path. However, there is a physical limit to creating conveyance paths on the two-dimensional conveyance line, and there is a possibility that selecting another route will interfere with the conveyance of another carrier.

Specifically, as shown in FIG. 2, a plurality of two-dimensional electromagnetic conveyance lines 101, positioned behind an analysis unit 104, are connected to one another. A position 201 occupied by a carrier loaded with a test tube is indicated by a black circle, and a position 202 without a carrier is indicated by a white circle. The management terminal 401 plans to convey a carrier 205 to a position 203 or a position 204 based on the request information. The position 203 corresponds to a tail end of one of the left carrier groups (buffers) stagnated on the two-dimensional conveyance line connected to the analysis unit 104, and the position 204 corresponds to the tail end of another carrier group.

In the same time period, when a carrier 206 attempts to use a route 212 due to an emergency specimen, since the carrier 205 is using the route 212, the management terminal 401 may position the carrier 205 at the tail end of the carrier group on the right side with the smaller number of waiting carriers, but such positioning can lead into interfering with the conveyance of the carrier 206 and subsequent delay in the measurement results of the emergency specimen.

Here, the carrier 206 may be conveyed first and the carrier 205 may be conveyed after the carrier 206. However, the carrier 205 has to wait until the carrier 206 is conveyed, and then a carrier 207 and a carrier 208 following the carrier 205 has to wait too. Since the standby times lead to congestions, to carry more samples into the automatic analysis system, the carriers 205, 207, and 208 needs to be conveyed even a little. For the reasons described above, the carrier may be stopped at the tail end of the buffer.

As shown in FIG. 3, when a plurality of carriers such as carriers 301 to 302 are stagnated on the conveyance path selected by carriers 303, 304, and 305, it takes 1.0 seconds for the carrier 302 to move two positions, and then a carrier 306 starts moving. In other words, it takes 1.5 seconds for the carrier positioned downstream among the adjacent carriers to move. Accordingly, the position occupied by the carrier 301 is free 4.5 seconds after the carrier 302 starts to move.

Therefore, in the present embodiment, for the conveyance to a row in which a plurality of carriers are stagnated, to not lengthen the stagnated row, a standby time calculation unit 4024 of the conveyance line management unit 402 obtains a standby time of the carrier at the tail end of the row in which the carriers are stagnated from the number of stagnated carriers based on the information detected by the carrier management unit 4022.

Next, a travel time calculation unit 4023 calculates a travelling speed of the carrier based on a distance from a starting point to an arrival position that is the tail end of the row where the carriers is stagnated, to move the carrier within the carrier standby time calculated by the standby time calculation unit 4024, which is the time for the carrier at the tail end to travel from the arrival position. By changing the travelling speed in the same way for subsequent carriers, it is possible to increase the number of carriers that can be conveyed without interfering with the travelling of a plurality of carriers while avoiding stagnation of the carriers and extension of stagnated carrier rows.

Second Embodiment

Meanwhile, when the travel distance of the carrier determined by the management terminal 401 is based on a distant destination that straddles a plurality of two-dimensional electromagnetic conveyance lines, the conveyance path management unit 4021 may check the state of the conveyance path, and when there is no carrier as an obstacle, the carrier to be conveyed can be conveyed at the maximum speed. The maximum speed is 0.5 to 1.0 m/s, which is the maximum speed at which the specimen to be inspected inside the test tube does not scatter or splash. The maximum speed may be changed according to the conveying surface, carrier material, and compatibility. When the normal conveyance speed is 0.5 m/s and the maximum speed is 1.0 m/s, the average conveyance time can be shortened by about 1.3 seconds. The shortened time corresponds to 75% of the travel distance of the two-dimensional electromagnetic conveyance percentile when conveyed at the normal conveyance speed. There is also an advantage in increasing the speed.

FIG. 5 shows an example of the processing flow of a conveyance speed calculation unit 4032 of the conveyance line control unit 403 including the conveyance speed calculation unit 4032, the carrier detection unit 4033, a carrier free time calculation unit 4044, and the like. This processing flow is processed by the conveyance line control unit 403, and the conveyance path and standby time are designated in advance.

At S502, first, a conveyance speed coefficient as an initial value is set to 1.0. At S503, the conveyance path instructed by the conveyance path management unit 4021 is checked, and the travel distance is calculated. At S504, from the travel distance calculated at S503, travel time may be obtained by travel time=acceleration time+(conveyance distance−acceleration/deceleration distance)/speed+deceleration time. Here, the acceleration time and the deceleration time should be accelerations that do not scatter the specimen sample filled in the test tube as described above, so fixed time can be considered.

At S505, it is determined whether the carrier can be conveyed in the conveyance area, that is, it is checked whether there is no carrier up to the arrival position based on the information of the carrier detection unit 4033. If there should be a carrier on the conveyance path to the arrival position, a position in front of such a carrier may be set as the arrival position, or the conveyed carrier may be stopped at that position. In the present embodiment, it is assumed that the carrier is conveyed to the tail end of the carrier buffer unit. At S505, when the carrier exists in the middle of the conveyance path, the process proceeds to S506. Meanwhile, at S505, when there is no carrier in the middle of the conveyance path, the process proceeds to S508. At S506, to confirm that there is no discrepancy from the information calculated by the standby time calculation unit 4024, the carrier free time calculation unit 4034 calculates the time until the position of the conveyance destination is free, which is the time when the carrier is free as described in FIG. 3 based on the latest information from the carrier detection unit 4033.

Carrier free time=(number of standby carriers−1)×(travel time for 1 position×2)+travel time for 1 position.

At S507, the times calculated at S504 and S506 are compared to determine whether carrier free time>travel time. In the calculation, as described above, since it is assumed that the acceleration time and deceleration time are fixed times, the time in a lower speed section is compared, such that a conveyance speed coefficient is obtained by Conveyance speed coefficient=(Travel time−Acceleration/deceleration time)/(Carrier free time−Acceleration/deceleration time). At S508, the conveyance speed coefficients obtained at S502 and S507 are used to determine the conveyance speed, and at S509, the two-dimensional electromagnetic conveyance line 101 is instructed to drive the carrier. As a result, the carriers travel while the tail end position of the stagnated carrier group is free, so that the carriers can be conveyed without stopping. When the time until the carrier at the conveyance destination position is free is shorter than the carrier travel time, it is possible to increase the conveyance speed to be faster than the specified value. However, as described above, the maximum speed should be such that the specimen sample filled in the test tube does not scatter. Therefore, when the conveyance speed obtained at S508 exceeds the maximum speed, the conveyance speed should be set to the maximum speed.

Third Embodiment

The carriers 303, 304, and 305 shown in FIG. 3 are each movable for 1.0 seconds. However, when the distance between the carriers 303 and 304 is less than two positions, the carrier 304 has a travel time of less than 1.0 seconds, for example, 0.8 seconds. To avoid collision between carriers, when the carrier 304 intends to start travelling, the carrier 304 does not move until the position where the carrier 303 exists, that is, the position of the travel destination, is free. Therefore, the travel time calculation unit 4023 refers to the travel time of the travelling carrier 303 and changes the speed of the carrier 304, thereby avoiding collisions between the carriers.

The present invention is not limited to the embodiments described above, and includes various modifications. For example, the embodiments described above are described in detail in order to explain the present invention in an easy-to-understand manner, and are not necessarily limited to those having all the configurations described above. A part of the configuration of an embodiment may be replaced with the configuration of another embodiment, and the configuration of another embodiment may be added to the configuration of an embodiment. It is also possible to add, delete, or replace a part of the configuration of each embodiment with a configuration included in another embodiment.

REFERENCE SIGNS LIST

101: two-dimensional electromagnetic conveyance line,
102: inserting/storage unit of simultaneous analysis system,
103: interface unit,
104, 105, 106, 107: analysis unit,
108: laboratory information system (LIS),
201: position where carrier exists,
202: position where no carrier exists,
203, 204: arrival position of carrier,
205, 206: starting position of carrier,
207, 208; travelling carrier,
211, 212, 213: conveyance path,
301, 302, 306: stagnated carrier,
304, 305: carrier waiting to travel,
401: management terminal,
4011: system management unit,
4012: trouble monitoring unit,
4013: processing performance calculation unit,
402: conveyance line management unit,
4021: conveyance path management unit,
4022: carrier management unit,
4023: travel time calculation unit,
4024: standby time calculation unit,
403: conveyance line control unit,

8

4031: carrier control unit,
4032: conveyance speed calculation unit,
4033: carrier detection unit,
4044: carrier free time calculation unit,
502: conveyance speed coefficient set,
503: processing of confirming conveyance path,
504: carrier travel time calculation processing,
505: processing of determining whether to convey in conveyance area,
506: processing of calculating carrier standby time at arrival position of carrier,
507: processing of recalculating conveyance speed coefficient,
508: processing of calculating conveyance speed from conveyance speed coefficient,
509: conveyance instruction processing,
601: bound to belt conveyance line,
602: return to belt conveyance line return,
603: sample inserting/storage unit,
604, 605: analysis unit,
606, 607: carrier buffer unit,
608: belt conveyance carrier

The invention claimed is:

1. A specimen inspection system comprising:
a processing unit configured to analyze and process a specimen;
a conveying unit connected to the processing unit and including a plurality of conveying surfaces for carriers; each conveying surface including a plurality of electromagnetic induction coils disposed in a two-dimensional array, the conveying unit configured to generate a magnetic force by causing a current to flow through the electromagnetic induction coils;
a carrier control unit configured to convey a first carrier by incorporating a magnet into the first carrier and applying a current to the electromagnetic induction coils;
a carrier detection unit configured to detect a position of the first carrier travelling in the conveying unit;
a conveyance speed calculation unit configured to receive the detected position of the first carrier from the carrier detection unit and calculate a conveyance speed of the first carrier based on a distance between the detected position and an arrival position of the first carrier;
a carrier management unit configured to manage the position and state of the first carrier in the conveying unit;
a conveyance path management unit configured to manage a departure location, a destination and a route for the first carrier;
a standby time calculation unit configured to calculate a standby time for the first carrier positioned at the departure location to reach the destination; and
a travel time calculation unit configured to calculate a travel time required for the first carrier at the departure location to travel to the destination, wherein the conveyance speed calculation unit is configured to compare the travel time and the standby time and calculate a first conveyance speed at which the first carrier does not stagnate based on the comparison wherein the carrier control unit is configured to convey the first carrier at the departure location with the calculated first conveyance speed.

2. The specimen inspection system according to claim 1, wherein the standby time calculation unit is configured to determine whether the first carrier can be conveyed based on the calculated standby time and the conveyance speed calculation unit is configured to calculate the conveyance speed when the standby time calculation unit determines the first carrier can be conveyed.

3. The specimen inspection system according to claim 1, wherein the standby time calculation unit is configured to calculate a second conveyance speed for a second carrier.

4. A method of using the specimen inspection system of claim 1, the method comprising:

conveying a first carrier by incorporating a magnet into the first carrier and applying a current to the electro- magnetic induction coils;

detecting the position of the first carrier travelling in the conveying unit;

calculating the first conveyance speed of the first carrier based on the distance between the detected position of the first carrier travelling in the conveying unit and the arrival position of the first carrier;

managing the position and state of the first carrier in the conveying unit, the departure location, the destination and the route of the first carrier;

calculating the standby time for the first carrier positioned at the departure location to reach the destination;

calculating the travel time required for the first carrier to travel to the destination;

comparing the travel time and the standby time;

calculating the first conveyance speed at which the travel source carrier is not stagnated based on the comparison; and conveying the first carrier at the calculated conveyance speed.

\*    \*    \*    \*    \*